(12) United States Patent
Gronskov

(10) Patent No.: US 6,416,020 B1
(45) Date of Patent: Jul. 9, 2002

(54) METHOD AND APPARATUS FOR DETECTING DEFECTIVE TRACK WHEELS

(76) Inventor: Leif Gronskov, Ny Maeglergards Alle 77, Vallensbaek Strand DK-2665 (DK)

( * ) Notice: Subject to any disclaimer, the term of this patent is extended or adjusted under 35 U.S.C. 154(b) by 0 days.

(21) Appl. No.: 09/743,228
(22) PCT Filed: Jul. 12, 1999
(86) PCT No.: PCT/DK99/00394
§ 371 (c)(1),
(2), (4) Date: Jun. 12, 2001
(87) PCT Pub. No.: WO00/02757
PCT Pub. Date: Jan. 20, 2000

(30) Foreign Application Priority Data

Jul. 10, 1998 (DK) .................... 1998 00924

(51) Int. Cl.⁷ .................................. B61L 3/00
(52) U.S. Cl. .................................. 246/169 D
(58) Field of Search ............ 246/169 R, 169 A, 246/169 D, 169 S, 249, 121, 122 R; 33/1 Q; 356/602, 606, 607, 608; 250/224

(56) References Cited

U.S. PATENT DOCUMENTS

| 4,129,276 A | * 12/1978 | Svet ................... 246/169 A |
| 4,379,330 A | * 4/1983 | Sanville ................ 246/249 |
| 4,696,446 A | * 9/1987 | Mochizuki et al. ....... 246/169 R |
| 4,702,104 A | * 10/1987 | Hallberg ............... 246/169 R |
| 4,843,885 A | * 7/1989 | Bambara ................ 246/169 R |
| 5,351,411 A | 10/1994 | Gronkov |
| 5,433,111 A | * 7/1995 | Hershey et al. ......... 246/169 R |
| 5,636,026 A | 6/1997 | Mian |
| 5,764,162 A | * 6/1998 | Ehrlich ................. 246/122 R |
| 6,119,353 A | 9/2000 | Gronskov |
| 6,216,985 B1 | * 4/2001 | Stephens ................ 246/121 |

FOREIGN PATENT DOCUMENTS

| EP | 0 667 526 | 7/1994 |
| WO | 88/02713 | 10/1987 |
| WO | 90/12720 | 4/1990 |
| WO | 92/00214 | 3/1991 |

* cited by examiner

Primary Examiner—Mark T. Le
(74) Attorney, Agent, or Firm—Merchant & Gould PC

(57) ABSTRACT

Method and apparatus for the detection of defective track wheels on rail vehicles such as carriages and/or locomotives, whereby an electromagnetic beam such as a laser beam (9) is directed towards the wheel (5) in a direction substantially at right-angles to the plane of the wheel while the carriage and/or the locomotive is running. A series of signals are recorded corresponding to electromagnetic beams reflected from the wheel (5) substantially at right-angles to the plane of the wheel, and a measurement is carried out of the Doppler frequency change between the transmitted beam (9) and the reflected beam. On the basis hereof, a signal processing is effected for the determination of the vibration pattern of the relevant wheel, and a determination of the condition of the relevant wheel is carried out on the basis of the vibration pattern.

9 Claims, 2 Drawing Sheets ically at right-angles to the plane of the wheels, and such that a suitable part of the wheel disk is swept by the laser beam. For example, the laser sensor can be placed so that the beam impinges on the wheel disk mainly between the wheel axle and the rim of the wheel.
METHOD AND APPARATUS FOR DETECTING DEFECTIVE TRACK WHEELS

FIELD OF THE INVENTION

The invention concerns a method and an apparatus for the detection of defective track wheels on rail vehicles such as locomotives and railway carriages.

BACKGROUND OF THE INVENTION

With hitherto-known methods, the checking of whether the wheels are defective is carried out while the vehicles are standing still. Among other things it is thus known to use ultrasound measurements and electromagnetic eddy current measurements when the carriages are at a standstill. Moreover, it is commonly known to carry out purely manual detection, in that a hammer or the like is used to tap the wheels one after the other, whereby the practised test person purely from experience can thus hear whether a wheel is defective from the ringing tone from the wheels.

SUMMARY OF THE INVENTION

The object of the invention is to provide a method and an apparatus whereby it can be detected with greater certainty than with known techniques and while the wheels are rolling whether a wheel is defective, i.e. while the locomotives and the carriages are running in the normal manner.

This is achieved by a method whereby, while the locomotive and/or the carriage is running, an electromagnetic beam is directed towards the wheel in a direction substantially at right-angles to the plane of the wheel, that a series of signals are detected corresponding to the reflected electromagnetic beams from the wheel substantially at right-angles to the plane of the wheel, that a measurement is effected of the Doppler frequency change between the transmitted beam and the reflected beam, that on the basis of this a signal processing is effected to determine the vibration pattern of the relevant wheel, and that a determination of the condition of the relevant wheel is undertaken on the basis of the vibration pattern.

The invention also concerns an apparatus which is characteristic in that it comprises a laser sensor for the measurement of the speed of lateral vibrations of a wheel, in that the laser sensor is designed to transmit a laser beam towards the wheel in a direction substantially at right-angles to the plane of the wheel, that the laser sensor is designed to receive beams reflected from the wheel, and that the laser sensor is designed to calculate the substantially lateral vibrations of the wheel on the basis of the Doppler frequency change, that the apparatus comprises elements to determine a vibration pattern for the individual wheels on the basis of the calculated lateral vibrations of a number of points on the individual wheel, and that the apparatus comprises memory units for the storage of the measured data.

With the method respectively the apparatus according to the invention, it is thus achieved that detection of the individual rail vehicles, locomotives, carriages etc. can be carried out while these are running in a normal manner on the railway tracks, in that one or more places on particularly busy railway sections can be selected on which measurements are under-taken according to the invention. There will thus be achieved a greater degree of security against accidents arising from defective wheels, and greater operational security will also be achieved, in that possible future defects will be able to be detected in such good time that a replacement or repair will be able to be planned.

With the invention, one or more laser sensors or the like are placed in the vicinity of a rail element on which the carriages and the locomotives operate, so that the transmitted laser beam is transmitted towards and substantially at right-angles to the plane of the wheels, and such that a suitable part of the wheel disk is swept by the laser beam. For example, the laser sensor can be placed so that the beam impinges on the wheel disk mainly between the wheel axle and the rim of the wheel.

The laser sensor will thus be able to measure the speed of the wheel's lateral vibrations. These vibrations, which are caused by the physical influences on the wheel, will contain information concerning the condition of the relevant wheel, corresponding to that information which is obtained by the tapping of a static wheel and subsequent evaluation of the ringing tone from the wheel.

Since the laser sensor with its associated equipment is set up in a permanent position, special measures can be taken in order to ensure that the wheels vibrate to a sufficient degree or in a special manner to enable sufficiently good measuring results to be achieved. There can thus be irregularities in the track itself, or a device can be provided whereby during the passage of the wheel this abuts against a part of the wheel, such as e.g. the wheel flange.

When the laser sensor has detected the reflected signals, a subsequent processing of the signals is effected with the object of producing signals which are representative of the wheel's vibrations, and a storage of all the measured signals is carried out.

With the method and the apparatus, an appropriate measurement is effected which ensures an identification of the wheels and/or the carriages/locomotives on which the detection is being carried out. For example, the carriages/locomotives and/or the individual wheels can be provided with known types of identification markers which can be detected and identified by contact-free measurements, such as e.g. magnetic, inductive, capacitive or optical identification markers. Therefore, the apparatus according to the invention should preferably also comprise elements for the identification of these identity markers, and a subsequent storage of this data is effected in such a manner that the correlation with the vibrations measured from the relevant wheels is ensured.

A suitably large number of measurements are carried out for each wheel, hereby ensuring that the vibration pattern of the relevant wheel is determined to a sufficient degree. A further signal processing can then be carried out with the object of determining whether the individual wheel is defective or in order. This can be carried out e.g. by comparing the vibration pattern with representative vibration patterns, where a deviation (within certain tolerances) can result in the relevant wheel being judged to be defective. An evaluation can possibly result in a message being sent to a central surveillance unit to the effect that the relevant wheel must be given a closer examination, e.g. by an examination of the types known in the introduction, when the relevant carriage or the relevant locomotive is available at a station or in an engine shed where the examination can take place.

The further signal processing can also take place by comparing the measurements obtained from a wheel with earlier measurements from the same wheel or possibly from wheels which are of the same type as the relevant wheel, which will be the case if the wheels used are divided into categories, where wheels within the same category have identical or more or less the same vibration patterns. If during this comparison the relevant wheel displays unacceptable deviation, it can thus be judged to be defect or possibly, as mentioned above, it can be pointed out as a wheel which must be subject to further investigation. In both cases a message to this effect will be sent from the apparatus to a central surveillance unit.

The recorded measurements, especially including the measured vibration patters, can be collected in a database where they can be used for carrying out various analyses, and can serve to improve future diagnoses. For example, the database can be used to form a picture of the temporal development of the vibration pattern for specific wheels throughout their lifetimes, and the general development of the vibration patterns over periods of time can also be followed.

BRIEF DESCRIPTION OF THE FIGURES

In the following, the invention will be explained in more detail with reference to the drawing, in that FIG. 1 shows the principle according to an embodiment of the invention for the measurement of vibrations in a wheel for the detection of whether a wheel is defective.

DETAILED DESCRIPTION OF THE PREFERRED EMBODIMENTS

With the example embodiment, use is made of laser technique, where a laser sensor is used to measure the speed of an element which reflects a laser beam from the sensor, in that a measurement is taken of the Doppler frequency change between the transmitted laser beam and the reflected laser beam received.

Figure 1:
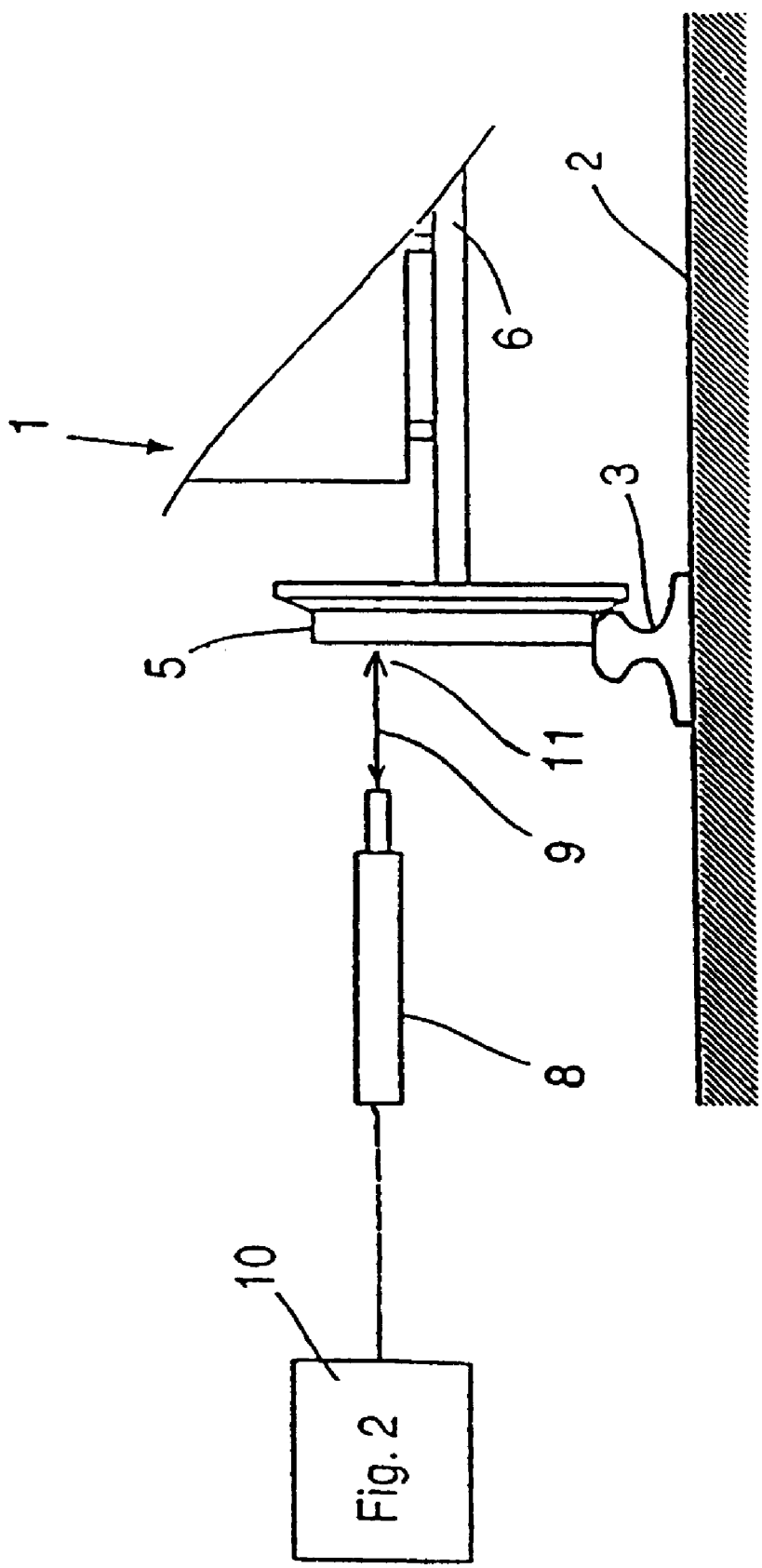

As shown in FIG. 1, according to the invention this can be used for the measurement of vibrations in a wheel on a railway vehicle. In the figure there is shown a smaller part of a railway vehicle 1, which can be a locomotive, a tram car or a railway carriage. This vehicle runs over a ground surface or an under layer 2 on which railway tracks 3 are laid, in that the vehicle 1 has a number of track wheels or railway wheels 5 mounted on axles 6.

One or more laser sensors 8 of the kind described for the measurement of vibrations or speed can be placed at a suitable place along the track for the detection of the condition of the wheel. This or these laser sensors are placed in suitable proximity of the rail, so that a laser beam 9 transmitted from the laser sensor 8 can impinge on a suitable place on the side surface or wheel disk of the wheel 5.

When this laser beam 9 impinges on the wheel disk, a reflection will occur from the reflection point 11, in that a reflection takes place in all possible directions, and thus also back towards the laser unit 8. This laser unit comprises a sensor for the measurement of the frequency of the reflected laser beam, so that a measurement of a possible Doppler frequency change can be effected. There is hereby obtained an expression for the speed of a possible lateral displacement or vibration of the wheel disk.

For the generation of such a vibration in the wheel 5, the rail 3 itself can be configured with a deformity, such as a downwards or upwardly projecting deformation, or the side of the rail 3 can be configured with a deformity, such as a punctiform bulge or the like, which abuts against the flange of the wheel and causes this to vibrate when it passes the place in which the laser sensor(s) 8 of the apparatus is/are placed. Moreover, separate means can be placed in connection with the rail which abut against the wheel 5, e.g. against the wheel flange, when the wheel passes the relevant place. These means can be static means or they can be means which are movable and controlled so that they abut against the wheel 5 during its passage. The means discussed for the generation of vibrations in the wheels are not shown in FIG. 1.

As shown, a laser sensor 8 can be placed so that its transmitted beam 9 is approximately at right-angles to the wheel disk of the wheel 5, but other directions will also be possible. Moreover, the laser sensor 8 can be positioned so that the transmitted beam 9 (with the shown position of the wheel 5), impinges on the wheel disk approximately between the wheel axle 6 and the rim of the wheel 5, either as shown in FIG. 1 above the wheel axle 6 or below it, but other points of impingement are possible, the important thing being that the laser beam 9 is directed towards points on the wheel 5 where the vibrations will be greatest. For example, the beam can be positioned in such a manner that it impinges to a higher degree on outer areas of the wheel disk, where vibrations and/or loads Will be greatest, and/or areas where there is the greatest risk of fractures in the wheel. Furthermore, it will be quite obvious that the transmitted laser beam 9 will impinge on a whole series of points on the wheel disk during the passage of the wheel, and with the shown positioning of the laser sensor there will be the possibility of carrying out a number of measurements at different places on one and the same wheel disk during the passage of the wheel.

As mentioned, the laser sensor 8 can measure the lateral speed of the individual points, which in practice will mean a long series of measurements at individual points which form a track on the wheel disk, which is impinged upon by the laser beam 9, and herewith a vibration pattern for the estimated or provoked vibration of the wheel. This is effected by the measured signals from the laser sensor 8 being sent further to a signal processing unit 10, which will be described in more detail later with reference to FIG. 2.

FIG. 1 shows only a section of an apparatus placed on the one side of a rail element, but it is obvious that corresponding equipment can expediently be placed at the same place on the other side of the rail element for the measurement and detection of wheels on the other side of the rail vehicles 1. The signal processing unit 10 can in such case possibly be common for laser sensors on both sides of the rail element. FIG. 1 shows only a single laser sensor 8, but it is obvious that several sensors can be placed on the same side, whereby several measurements among other things can be carried out simultaneously on one and the same wheel disk.

Moreover, in connection with the positioning of the laser sensor 8, means (not shown) will be provided for the identification of the individual rail vehicle and/or even identification of the individual wheel. For example, the carriages/locomotives and/or the individual wheels can be provided with known types of identification markers which can be detected and identified by contact-free measurements, such as e.g. magnetic, inductive, capacitive or optical identification markers. The apparatus according to the invention can therefore also comprise elements for the identification of these identity markers, and these identification signals are similarly sent further to the measurement and detection unit 10.

Figure 2:
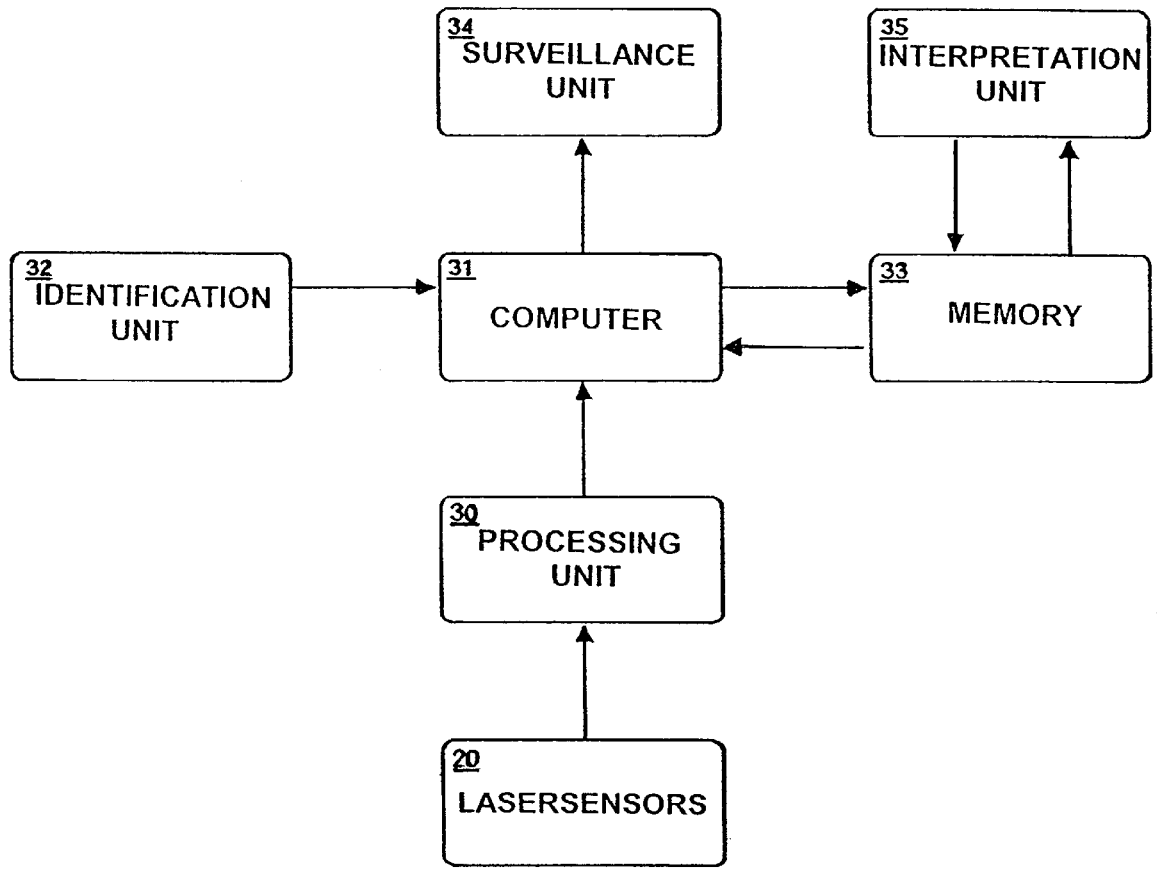
FIG. 2 is a block diagram showing the measuring and detection unit according to an embodiment of the invention.

This measurement and detection unit 10 will now be discussed in more detail with reference to FIG. 2, which shows a block diagram of the system. As shown, a series of signals which are representative of the vibrations in the wheels while these are passing the measuring point at normal speed or possibly at reduced speed will be sent from a measuring block 20 containing one or more laser sensors 8 to a signal processing unit 30, where a vibration pattern will be determined and transmitted further to a computer unit 31. At the same time, this computer unit 31 receives signals from a unit 32 for the identification of the individual vehicle or the individual wheel 5, in that as mentioned this is effected by commonly-known methods. In the computer unit 31, a correlation will thus be carried out between identity and vibration pattern, and the resulting sets of data will be stored in a memory unit 33. Moreover, the apparatus can be provided with one or more sensors for the determination of the speed of the vehicle or vehicles when this or these pass the place of measurement.

In the memory unit 33 there can also be stored a number of vibration patterns which are typical for the normal vibration condition of a wheel or a number of different types of wheels, so that when a definite vibration pattern has been recorded for a wheel, and an identification of the vehicle and herewith the wheel type has been carried out, or possibly an identification of the wheel itself, the computer unit 31 is used to carry out a comparison between the two patterns and to determine to what degree there is such a difference that an abnormality is indicated, possibly an abnormality which results in the relevant wheel having to be subjected to a closer examination. In these cases, a signal will be sent from the computer unit 31 to a centrally located surveillance unit 34, this signal containing an identification of the relevant rail vehicle and possibly an identification of the relevant wheel and information concerning the state of the abnormality, after which measures can be taken centrally to rectify the situation, for example by a replacement or repair of the relevant vehicle.

The memory unit 33 can also be used to store vibration patterns for wheels of the same category or even for one and the same wheel, in that said vibration patterns are recorded over a period of time so that an evaluation can be carried out of the development in the vibration patterns, and herewith the condition of the wheel as it progresses over a period of time. This can be carried out using a separate, subsequent processing and interpretation unit 35, whereby various analyses can be carried out on the basis of the hitherto-recorded vibration patterns, which among other things can be used to improve the processing which is implemented in the comparison of newly-determined vibration patterns with normal patterns with the object of determining whether the condition is normal or abnormal, i.e. a condition in which the relevant vehicle must be taken out of operation, or a future abnormality, i.e. a condition where a renovation of the wheels of the relevant vehicle can be planned.

It can thus be envisaged that the normal patterns stored in the memory unit 33 can be changed using results from the subsequent processing and interpretation unit 35, and that the tolerance thresholds and/or methods which are used in the comparative evaluation can be adjusted under control of the unit 35.

In the above, it is described that use is made of laser sensors, for example laser vibration meters, for the detection of vibration patterns, but it will be obvious that alternative use can be made of other sensors, e.g. electro-magnetic sensors in general, merely providing that these are able to detect the provoked vibrations.

What is claimed is:

1. A method for detecting defective track wheels on rail vehicles comprising:
    transmitting an electromagnetic beam towards a wheel in a direction which is substantially at right angle to a plane of the wheel;
    registering a series of signals corresponding to at least on electromagnetic beam reflected from the wheel at a substantially right angle to the plane;
    carrying out a series of measurements of a Doppler frequency change between the transmitted beam and the reflected beam;
    determining a vibration pattern of the wheel based on a signal process; and
    determining a condition of the wheel based on the vibration pattern.

2. The method of claim 1, further comprising the step of identifying the vehicle and/or the wheel by carrying out a measurement.

3. The method of claim 1, further comprising the step of applying an influence to the wheel for provoking and/or reinforcing vibrations in the wheel.

4. The method of claim 1, further comprising the step of comparing the vibration pattern of the wheel with a predetermined normal vibration pattern for a purpose of determining a condition of the wheel.

5. A The method of claim 1, further comprising the step of transmitting an alarm signal to a central surveillance unit in the event a wheel abnormality is determined.

6. An apparatus for detecting defective wheels on rail vehicles, comprising:
    a laser sensor for measuring the speed of lateral vibrations of a wheel, the laser sensor being positioned to transmit a laser beam towards a wheel in a direction that is substantially at a right angle to a plane of the wheel, to receive a beam reflected from the wheel and to calculate the speed of lateral vibrations of the wheel based on a series of measurements of a Doppler frequency change;
    elements that determine a vibration pattern for the wheel based on the calculated speed of lateral vibrations of a number of points on the wheel; and
    memory units for storage of data.

7. The apparatus of claim 6 further comprising elements identifying the rail vehicles and/or wheels.

8. The apparatus of claim 6 further comprising elements to determine a condition of the wheel by comparing the vibration pattern with patterns previously measured and/or with normal values.

9. The apparatus of claim 6 further comprising devices for exitacion and/or reinforcement of vibrations in the wheel when the wheel passes the apparatus.

* * * * *